United States Patent
Hua

(10) Patent No.: US 11,281,762 B2
(45) Date of Patent: *Mar. 22, 2022

(54) METHOD AND APPARATUS FOR FACILITATING THE LOGIN OF AN ACCOUNT

(71) Applicant: Advanced New Technologies Co., LTD., Grand Cayman (KY)

(72) Inventor: Jie Hua, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,477

(22) Filed: Feb. 28, 2019

(65) Prior Publication Data

US 2019/0199706 A1 Jun. 27, 2019

Related U.S. Application Data

(63) Continuation of application No. 14/920,716, filed on Oct. 22, 2015, now Pat. No. 10,313,327.

(30) Foreign Application Priority Data

Oct. 23, 2014 (CN) .......................... 201410571846.0

(51) Int. Cl.
*G06F 21/41* (2013.01)
*H04L 29/06* (2006.01)
(Continued)

(52) U.S. Cl.
CPC .............. *G06F 21/41* (2013.01); *H04L 63/06* (2013.01); *H04L 63/083* (2013.01);
(Continued)

(58) Field of Classification Search
CPC ... H04L 63/083; H04L 63/06; H04L 63/0815; H04L 67/02; H04L 67/306; G06F 21/41
(Continued)

(56) References Cited

U.S. PATENT DOCUMENTS 8,923,827 B2 * 12/2014 Wentker ................. H04W 4/80
455/414.1
9,106,642 B1 * 8/2015 Bhimanaik ........... G06F 21/335
(Continued)

FOREIGN PATENT DOCUMENTS

CN 1289974 A 4/2001
CN 102710759 10/2012
(Continued)

OTHER PUBLICATIONS

Extended European Search Report in European Application No. 15853447.9-1870, pursuant to Rule 62 EPC, the Supplementary European Search Report (Art 153(7) EPC) and the European Search Opinion, dated Sep. 5, 2017.
(Continued)

*Primary Examiner* — Dereena T Cattungal
(74) *Attorney, Agent, or Firm* — Finnegan, Henderson, Farabow, Garrett & Dunner, LLP

(57) ABSTRACT

Systems and methods are provided for facilitating account login, wherein the method is implemented by a first server that is associated with a first account. In some embodiments, the method comprises receiving, from a terminal device, a request to log into a second account associated with a second server, wherein the request includes a first identifier associated with the first account and a second identifier associated with the second server. The method further comprises generating account information to be transmitted to the second server based on the first identifier; and transmitting the account information to the second server based on the
(Continued)

second identifier; wherein the transmission of the account information enables the second account to be automatically logged into at the second server.

16 Claims, 4 Drawing Sheets

(51) Int. Cl.
    *H04L 67/02*         (2022.01)
    *H04W 12/069*     (2021.01)
    *H04L 67/306*     (2022.01)

(52) U.S. Cl.
    CPC .......... *H04L 63/0815* (2013.01); *H04L 67/02* (2013.01); *H04L 67/306* (2013.01); *H04W 12/069* (2021.01); *H04L 63/0281* (2013.01)

(58) Field of Classification Search
    USPC .......................................................... 726/9
    See application file for complete search history.

(56) References Cited

U.S. PATENT DOCUMENTS

| | | | |
|---|---|---|---|
| 9,325,696 B1* | 4/2016 | Balfanz | H04L 63/0815 |
| 9,870,583 B2* | 1/2018 | Lee | G06Q 30/0633 |
| 2005/0015593 A1 | 1/2005 | Cheng et al. | |
| 2006/0235779 A1 | 10/2006 | Drew et al. | |
| 2007/0244811 A1* | 10/2007 | Tumminaro | G06Q 20/12 |
| | | | 705/39 |
| 2008/0235779 A1 | 9/2008 | Bogner | |
| 2009/0132417 A1* | 5/2009 | Scipioni | G06Q 30/0603 |
| | | | 705/44 |
| 2010/0088237 A1* | 4/2010 | Wankmueller | G06Q 20/14 |
| | | | 705/75 |
| 2011/0066446 A1 | 3/2011 | Malec et al. | |
| 2012/0179552 A1* | 7/2012 | Tishkevich | G06Q 30/0269 |
| | | | 705/14.66 |
| 2012/0201032 A1* | 8/2012 | Holten | F21S 8/00 |
| | | | 362/296.01 |
| 2013/0174244 A1* | 7/2013 | Taveau | G06Q 20/12 |
| | | | 726/9 |
| 2014/0013109 A1* | 1/2014 | Yin | H04W 12/0608 |
| | | | 713/156 |
| 2014/0208407 A1* | 7/2014 | VanBlon | G06F 21/41 |
| | | | 726/8 |
| 2014/0215213 A1 | 7/2014 | Lund et al. | |
| 2014/0229331 A1* | 8/2014 | McIntosh | G06Q 30/0633 |
| | | | 705/26.41 |
| 2014/0366110 A1* | 12/2014 | Huhn | H04L 63/08 |
| | | | 726/7 |
| 2015/0089617 A1* | 3/2015 | Sondhi | H04L 63/10 |
| | | | 726/8 |
| 2015/0149766 A1* | 5/2015 | Shukla | H04L 63/0815 |
| | | | 713/155 |
| 2015/0222604 A1 | 8/2015 | Ylonen | |
| 2015/0363581 A1* | 12/2015 | Ranadive | G06F 21/34 |
| | | | 726/19 |
| 2017/0163628 A1* | 6/2017 | Zhang | H04L 63/083 |

FOREIGN PATENT DOCUMENTS

| | | |
|---|---|---|
| EP | 1 089 516 A2 | 4/2001 |
| GB | 2 384 069 A | 7/2003 |

OTHER PUBLICATIONS

PCT International Search Report and Written Opinion dated Jan. 19, 2016, issued in corresponding International Application No. PCT/US2015/056977 (7 pages).
SIPO First Search Report issued in Chinese Application No. 2014105718460 dated Mar. 9, 2018, 1 page.
Supplemental Search Report issued by the State Intellectual Property Office of People's Republic of China in corresponding Chinese Application No. 2014105718460, dated Mar. 27, 2019, 1 page.
Third Chinese Office Action issued by the State Intellectual Property Office of People's Republic of China in corresponding Chinese Application No. 2014105718460, dated Mar. 27, 2019, 16 pages.

\* cited by examiner

METHOD AND APPARATUS FOR FACILITATING THE LOGIN OF AN ACCOUNT

CROSS-REFERENCE TO RELATED APPLICATION

This application is a continuation of U.S. application Ser. No. 14/920,716 filed Oct. 22, 2015, which claims priority to Chinese Patent Application No. 201410571846.0, filed Oct. 23, 2014, both of which are incorporated herein by reference in their entireties.

TECHNICAL FIELD

The present disclosure generally relates to the field of computer technology and, more particularly, to a method and an apparatus for facilitating account login.

BACKGROUND

With the rapid development of computer technology, more users are accustomed to acquiring services through applications ("app") installed on mobile terminal devices.

In order to further expand the provided services, an app typically includes a browser (e.g., a built-in browser), which allows the user to acquire services through the built-in browser.

Specifically, a user can register an account on a first server, where the first server is associated with the app, and the user can then acquire services and resources from the first server by logging into that account. The first server can form a server-client relationship with the app. Therefore, from the perspective of the app, the first server can be regarded as an internal server, the account registered on the first server as an internal account, and the service provided by the first server as internal service. Moreover, a user can also register an account on a second server to obtain other services. From the perspective of the app, the second server is regarded as an external server, the account registered on the second server is regarded as an external account, and the other services provided by the second server are regarded as external services.

A user can use the app to log into an internal account to acquire internal services associated with the internal account. The user can also use the built-in browser of the app to log into an external account to acquire external services associated with the external account.

As an example, a mobile terminal can be installed with an instant messaging app that includes a built-in browser. After using the app to log into an instant messaging account hosted on an instant messaging server, the user can access the resources provided by the instant messaging server to engage in instant messaging with other users. The user can also use the built-in browser of the app to log into to a payment account hosted on a payment server to submit a payment. In this example, the instant messaging account is an internal account, and the instant messaging is an internal service. On the other hand, the payment account is an external account, while the processing of the payment is an external service provided by the payment server.

In the prior arts, an app can retrieve locally stored data to facilitate a user's login of an external account. Specifically, when the app acquires external account information, the app can store the information in the cookie data associated with the built-in browser. If the external account information is not yet stored in the cookie data, the built-in browser can direct the user to a login page of the external account, so that the user can input the external account information. The app can then store the received external account information in the cookie data. After obtaining the information (either from the cookie or from the user), the app can transmit the information to the external server associated with the external account, to facilitate the user's login of the account.

However, such arrangements pose security risk to the user, as majority of cookies data is not secure. Therefore, complete external account login information stored in the cookies, including the external account number and login credentials, can be accessed by unauthorized parties. Moreover, the built-in browser can also be directed to a fake login page, and the user can be cheated into giving out the account number, together with the login information. Therefore, requesting users to provide external account number and login information via a login page is also not secure.

SUMMARY

The present disclosure provides a method for facilitating account login. In some embodiments, the method is implemented by a first server that is associated with a first account. The method comprises receiving, from a terminal device, a request to log into a second account associated with a second server, wherein the request includes a first identifier associated with the first account and a second identifier associated with the second server. The method also comprises generating account information to be transmitted to the second server based on the first identifier. The method further comprises transmitting the account information to the second server based on the second identifier, wherein the transmission of the account information enables the second account to be automatically logged into at the second server.

In some embodiments, the request is generated by a browser associated with an app installed in the terminal device.

In some embodiments, the request is generated when the first account is logged into via the app.

In some embodiments, the method further comprises authenticating the second server before transmitting the first identifier to the second server; wherein the authenticating of second server comprises generating a token, transmitting the token to the second server, receiving a signature associated with the token from the second server, and determining the validity of the signature. In some embodiments, the second server is authenticated if the signature is determined to be valid.

In some embodiments, the second server is associated with a first key; wherein the signature is generated with a second key; and wherein the signature is determined to be valid if the second key matches the first key.

In some embodiments, the account information transmitted to the second server includes the first identifier. In some embodiments, the transmission of the first identifier enables the second server to determine the second account based on a first association between the first identifier and the second account. In some embodiments, the first association is associated with a fourth identifier; wherein the fourth identifier is associated with an app installed on the terminal device.

In some embodiments, the transmission of the first identifier causes the second server to create the second account based on a determination that the first association does not exist when the first identifier is transmitted.

In some embodiments, the account information transmitted to the second server includes a third identifier associated with the second account; wherein the account information is generated based on an association between the first identifier and the third identifier.

The present disclosure also provides a server for facilitating account login, wherein the server is associated with a first account. In some embodiments, the server comprises a memory device that stores a set of instructions, at least one processor capable of executing the set of instructions to receive, from a terminal device, a request to log into a second account associated with a second server, wherein the request includes a first identifier associated with the first account and a second identifier associated with the second server. The at least one processor is also capable of executing the instructions to generate account information to be transmitted to the second server based on the first identifier, and to transmit the account information to the second server based on the second identifier. In some embodiments, the transmission of the account information enables the second account to be automatically logged into at the second server.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Currently, to facilitate the login of an external account from a terminal device, a user can be directed to a webpage to provide complete login information of the external account, and the login information is then locally stored as cookie data at the terminal device. However, such arrangements pose security threat to the user, since the user can be directed to a fake webpage to give out the information to an unauthorized party, and that majority of cookie data is not secure.

Reference will now be made in detail to methods and specific implementations that seek to overcome the foregoing shortcomings of current systems and methods for facilitating the login of an account. Examples of these implementations are illustrated in the accompanying drawings. The following description refers to the accompanying drawings, in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
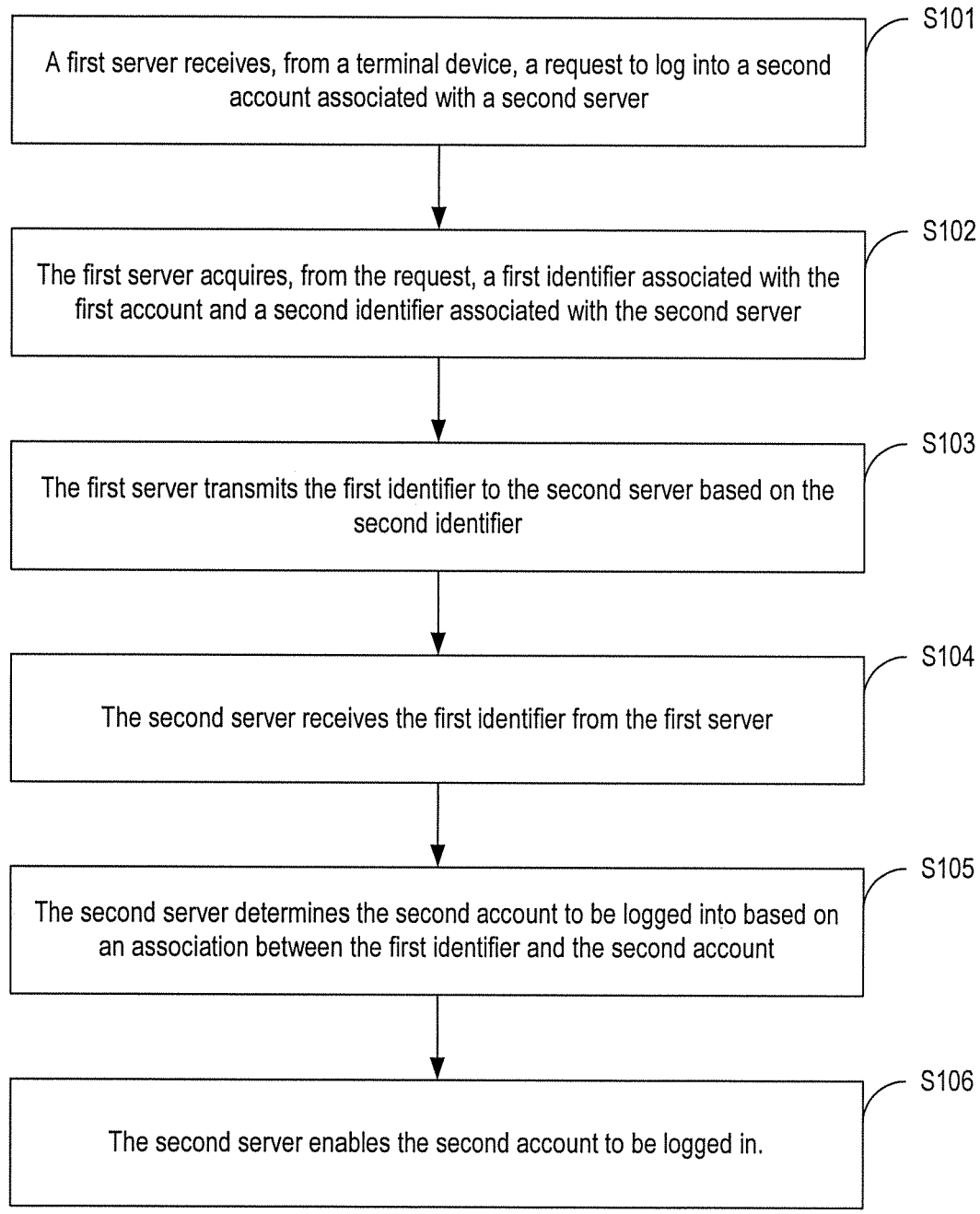
FIG. 1 is a flowchart illustrating an exemplary method for facilitating the login of an account, consistent with embodiments of the present disclosure.

Reference is now made to FIG. 1, which illustrates an exemplary method 100 for acquiring and processing operation instructions, according to embodiments of the present disclosure. The method can be performed by, for example, a first server associated with a first account and a second server associated with a second account. Referring to FIG. 1, method 100 includes the following steps.

In step S101, the first server receives, from a terminal device, a request to log into the second account associated with the second server.

In some embodiments, the first server can receive a request from a built-in browser of an app installed on the terminal device, after the app is used to log into the first account hosted by the first server. The first account provides access to the resources of the first server, while the second account provides access to the resources of the second server. As an illustrative example, after a user uses an instant messaging app to log into an instant messaging account (the first account) associated with an instant messaging server (the first server), the user can also log into a payment account (the second account) via a built-in browser of the instant messaging app. In that case, the instant messaging server (the first server) can receive, from a terminal device on which the app is installed, a request to log into the payment account (the second account).

In step S102, the first server acquires, from the request, a first identifier associated with the first account, and a second identifier associated with the second server. The second identifier can be, for example, an Internet Protocol (IP) address of the second server, or a domain name that corresponds to the IP address. Referring to the illustrative example above, in step S102, after the instant messaging server (the first server) receives the request from the terminal device, the instant messaging server can acquire an instant messaging account number (the first identifier associated with the first account) and the IP address of the payment server (the second server).

In step S103, the first server transmits the first identifier (associated with the first account) to the second server based on the second identifier. The transmission of the first identifier enables the second server to acquire login information about the second account based on an association between the first identifier and the second account, as to be discussed below.

Referring to the illustrative example above, in step S103, after the instant messaging server acquires the instant messaging account number and the IP address of the payment server from the request in step S102, the instant messaging server transmits the instant messaging account number to the payment server based on the IP address.

In some embodiments, before transmitting the first identifier (associated with the first account) to the server associated with the second identifier in step S103, additional steps can be taken to further improve security. For example, the first server can authenticate the second server, to confirm that the second server is authorized to receive the first identifier (or other information associated with the second account). The authentication reduces the likelihood of the first server transmitting the first account login information to an authorized server, and improves the security of the first account.

In some embodiments, the first server can perform the authentication as follows. First, the first server transmits a token to a target server (e.g., the second server associated with the second identifier included in the request received in step S102). The first server can then receive a signature associated with the token from the target server. The first server can then verify the signature and, based on a result of the verification, determine whether the target server is authorized to receive the second account information. If the first server determines that the signature is valid and that the target server is an authorized server, the first server can then transmit the second account information to the target server. In some embodiments, if the first server determines that the target server is unauthorized, it can return a message to the terminal device to indicate that the target server (e.g., an external server) is not secure.

In some embodiments, the token is generated by the first server. Any suitable methods can be used to generate the token. For example, the token can be dynamically generated with a random combination of alphabets, numbers, and symbols. In some embodiments, the token can be uniquely generated.

In some embodiments, a pair of corresponding public key and private key can be used for the verification. For example, the target server can use its own private key (which is typically inaccessible to other unauthorized servers) to sign the token, and then transmit the signature back to the first server. The first server can then use a public key to verify the validity of the signature. When an unauthorized server uses a private key that does not correspond to the first server's public key to sign the token, the first server can use its public key to determine that the signature is invalid, and that the target server is unauthorized.

In some embodiments, the public key can be provided by an authorized second server to the first server. In some embodiments, a registration process can be performed to register the second server with the first server, and the public key of the authorized server can be provided to the first server as part of the registration process. The second server can also provide other information to the first server as part of the registration process. Referring to the illustrative example above, the payment server (the second server) can be registered with the instant messaging server (the first server). During the registration process, the payment server can store its own private key, and then provide a corresponding public key to the instant messaging server for storage. The payment server can also provide other information, such as email addresses, phone numbers, physical addresses, etc. to the instant messaging server.

In some embodiments, the terminal device (from which the request is transmitted in step S101) can also transmit the token to the second server. For example, after the first server generates the token, the first server can transmit the token to the associated app installed on the terminal device. The app can then transmit, via its built-in browser, the token and an identifier associated with the first server (e.g., IP address) to the second server. The second server can then sign the token, and transmit the signature to the first server based on the first server identifier. The first server can then determine the validity of the signature, and determine whether to transmit the first account information to the second server in step S103 accordingly. In these embodiments, where the app transmits the token to the second server, the request transmitted in step S101 can exclude the second identifier associated with the second server, and the first server acquires the first identifier associated with the first account but not the second identifier in step S102.

In step S104, the second server receives the first identifier from the first server.

In step S105, the second server determines the second account to be logged into based on an association between the first identifier (associated with the first account) and the second account, and acquires the login information associated with the second account. In some embodiments, the association is represented by a mapping table that maps between the first identifier and a third identifier associated with the second account. The first and third identifiers can be any combination of numbers, symbols, and alphabets configured to identify respectively the second and the first accounts. Table 1 illustrates an exemplary mapping table according to embodiments of the present disclosure:

TABLE 1

| Second account | First account |
|---|---|
| 208801 | 1980001 |
| 208802 | 1980002 |

As shown in Table 1, a second account (e.g., the payment account) is associated with a third identifier (e.g., an account number "208801"), a first account (e.g., the instant messaging account) is associated with a first identifier (e.g., an account number "1980001"), and Table 1 maps between the third identifier and the first identifier. Also, another second account with an account number "208802" is mapped to another first account with an account number "1980002." If, in step S105, the second server receives an account number "208801" as the first identifier (associated with the first account), the second server can determine, from Table 1, that the associated second account to be one with account number "208801."

In some embodiments, the association between the second account "208801" and the first account "1980001" in Table 1 can be established based on other account login information, such as user name and password, as follows. As an illustrative example, second account "208801" is associated with a user name "B" and a password "22," while first account "1980001" is associated with a user name "A" and a password "11." A user can first log into the second account "208801" associated with the second server by, for example, inputting the user name "B" and password "22." After logging into the second account, the user can be directed to a web page under the second account, where the user can be prompted to provide partial login information for the first account "1980001" (e.g., user name "A" and password "11") to the second server. The second server can then transmit the first account login information to the first server, which can then verify the received information. After the verification, the first server can transmit the first account number "1980001" back to the second server. The second server can then associate second account number "208801" with the received first account number "1980001" by, for example, updating Table 1.

In some embodiments, the association between the first and second accounts is stored in the second server. In some embodiments, the association can be established and stored at the first server. The process of establishing the association can be similar to what is described above and is not repeated here.

In step S106, the second server enables the second account to be automatically logged in using the second account login information (e.g., second account number) acquired in step S105, thereby enabling the user to access the resources of the second server. Referring to the illustrative example above, the payment server (the second server)

determines the payment account number to be "208801," based on the instant messaging account number "1980001" received from the instant messaging server and Table 1. The payment account "208801" can then be automatically logged in at the payment server, which can provide the payment service to the user.

Referring back to step S105, In some embodiments, if the second server cannot locate or determine the second account that is mapped to the first identifier from Table 1, the second server can create an account and cause the account to be automatically logged in. The second server can then provide the service associated with that account. The second server can also map the created account to the first identifier by, for example, updating Table 1. The mapping can occur before or after the created account is logged in.

In some embodiments, multiple apps can be installed on the terminal device, and each app can be associated with different first accounts and/or different second accounts. As an illustrative example, as shown in Table 2, a first app is associated with a second account with account number "1980001" and a first account with account number "208801," while a second app is associated with a second account with account number "1980002," and the same first account as the first app. With two second accounts being associated with the same first account (with account number "208801") in Table 2, the second server may not be able to determine which of the second accounts to log into when it receives the account number "208801" (the first identifier) from the first server in step S104, and a login failure may result.

TABLE 2

| Second account | First account |
| --- | --- |
| 1980001 | 208801 |
| 1980002 | 208801 |

In some embodiments, to account for a scenario where different apps can be associated with the same first and/or second account, the mapping table can associate a pair of first and second accounts (represented by their identifiers, such as account numbers) with an app identifier. For example, as shown in Table 3, the first app with an identifier "APP1" is associated with a second account with account number "1980001" and with a first account with account number "208801." Moreover, the second app with an identifier "APP2" is associated with a second account with account number "1980002" and with a first account with account number "208801." With such arrangements, the second server can determine the second account to log into, based on not just the first account identifier but also the app identifier.

TABLE 3

| Second account | First account | App identifier |
| --- | --- | --- |
| 1980001 | 208801 | APP1 |
| 1980002 | 208801 | APP2 |

In some embodiments, as described above, the association between the first account and the second account (e.g., Tables 1 and 3) can be stored in the first server as well. In these embodiments, the first server can use the first identifier (associated with the first account) from the request received in step S101 to acquire the second account information (e.g., the second account number) from Tables 1 and 3. The first server can then transmit the second account information to the second server associated with the second identifier included in the request. The second server can then use the received second account information and log into the second account, in step S106. In some embodiments, before the transmission, the first server can also verify whether the second server is authorized to receive the information using similar techniques (e.g., verification of signature using public and private keys) as described above.

Figure 2:
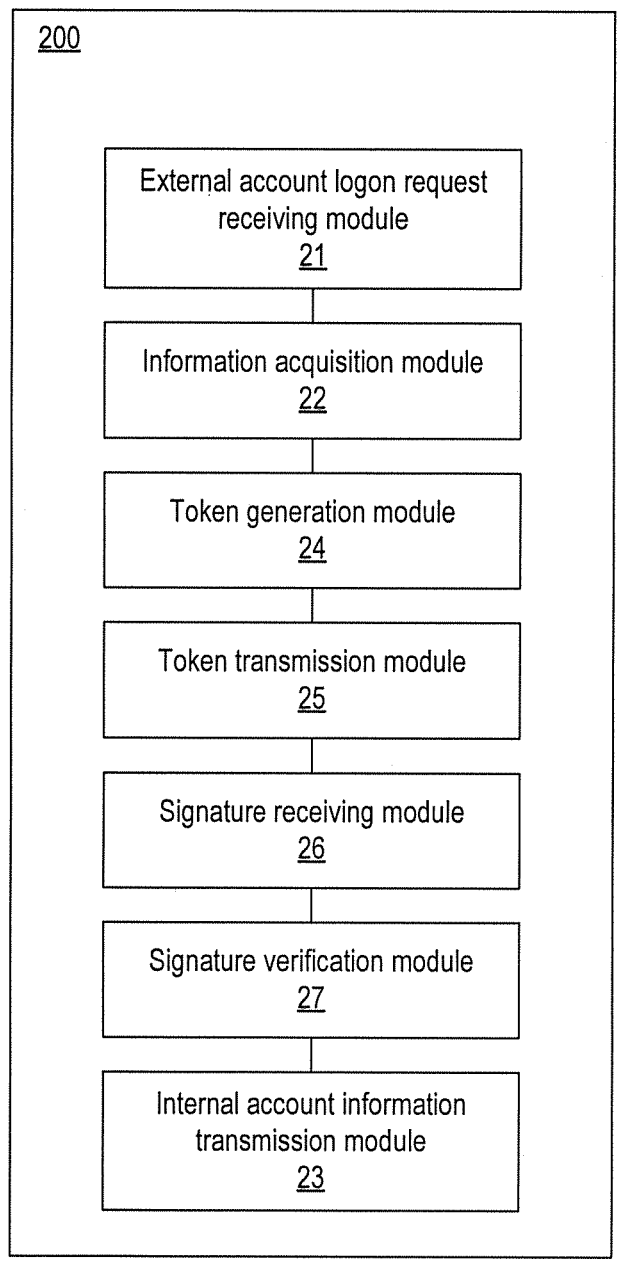
FIG. 2 is a block diagram illustrating an exemplary apparatus for facilitating the login of an account, consistent with embodiments of the present disclosure.

FIG. 2 is a block diagram illustrating of an exemplary apparatus 200 for facilitating login of an account, consistent with embodiments of the present disclosure. As shown in FIG. 2, apparatus 200 includes an external account logon request receiving module 21, an information acquisition module 22, and an internal account information transmission module 23. In some embodiments, apparatus 200 is configured to be the first server (e.g., an internal server) that implements at least some of the steps of method 100 of FIG. 1, where the first server is associated with a first account (e.g., the internal account) and a second server (e.g., an external server) is associated with a second account (e.g., the external account), and that the internal server receives a request for logging into the external account.

In some embodiments, external account logon request receiving module 21 is configured to receive, from a terminal device, a request to log into the second account associated with the second server. In some embodiments, external account logon request receiving module 21 can receive the request from a built-in browser of an app installed on the terminal device, after the app logs into the internal account associated with apparatus 200. The external account can provide access to the resources of the external server, while the internal account can provide access to the resources of apparatus 200. In some embodiments, external account logon request receiving module 21 is configured to implement at least part of step S101 of method 100.

In some embodiments, information acquisition module 22 is configured to acquire, from the request, a first identifier associated with the internal account, and a second identifier associated with the external server. The second identifier can be, for example, an Internet Protocol (IP) address of the external server, or a domain name that corresponds to the IP address. In some embodiments, information acquisition module 22 is configured to implement at least part of step S102 of method 100.

In some embodiments, internal account information transmission module 23 is configured to transmit the first identifier (associated with the first account) to the external server based on the second identifier. The transmission of the first identifier enables the external server to acquire information about the second account based on an association between the first identifier and the second account. In some embodiments, internal account information transmission module 23 is configured to implement at least part of step S103 of method 100.

In some embodiments, apparatus 200 further includes a plurality of authentication modules configured to authenticate the external server before internal account information transmission module 23 transmits the second account information (e.g., the first identifier associated with the second account) to the external server. In some embodiments, as shown in FIG. 2, the authentication modules include a token generation module 24, a token transmission module 25, a signature receiving module 26, and a signature verification module 27. In some embodiments, the aforementioned authentication modules are configured to implement at least part of the authentication process described with respect to method 100 of FIG. 1.

In some embodiments, token generation module 24 is configured to generate a token, which can then be transmitted by token transmission module 25 to the external server. Any suitable methods can be used to generate the token. For example, the token can be dynamically generated with a random combination of alphabets, numbers, and symbols. In some embodiments, the token can be uniquely generated.

In some embodiments, signature receiving module 26 is configured to receive a signature from the external server after the token is transmitted. The signature can then be verified by signature verification module 27. In some embodiments, a pair of corresponding public key and private key can be used for the authentication and verification processes. For example, an authorized external server can be associated with a specific private key that corresponds to a public key, and other unauthorized servers do not have access to that specific private key. After receiving a signature that is signed with a certain private key, signature verification module 27 can verify whether the private key of the received signature corresponds to the public key, and determine whether the external server is an authorized server accordingly.

Figure 3:
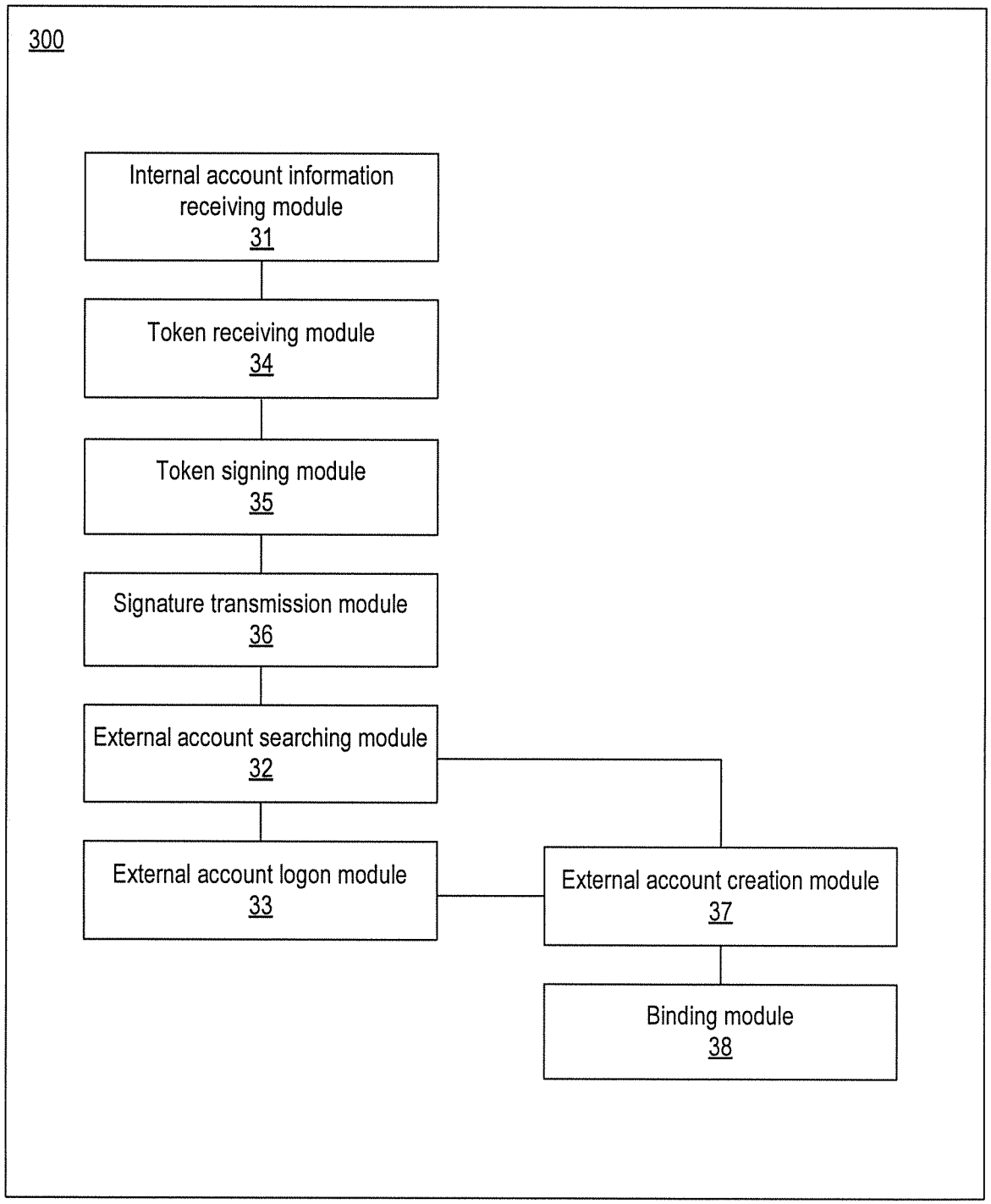
FIG. 3 is a block diagram illustrating an exemplary apparatus for facilitating the login of an account, consistent with embodiments of the present disclosure.

FIG. 3 is a block diagram illustrating of an exemplary apparatus 300 for facilitating the login of an account, consistent with embodiments of the present disclosure. As shown in FIG. 3, apparatus 300 includes an internal account information receiving module 31, an external account searching module 32, and an external account logon module 33. In some embodiments, apparatus 300 is configured to be the second server (e.g., an external server) that implements at least some of the steps of method 100 of FIG. 1, where a first server (e.g., an internal server) is associated with a first account (e.g., the internal account) and the second server is associated with a second account (e.g., the external account), and that the internal server receives a request for the login of the external account associated with the external server.

In some embodiments, internal account information receiving module 31 is configured to receive, from the internal server (e.g., apparatus 200 of FIG. 2), internal account information. The internal account allows access to the resources of the internal server. The information can include an identifier associated with the internal account (e.g., an account number). In some embodiments, internal account information receiving module 31 is configured to implement at least part of step S104 of FIG. 1.

In some embodiments, external account searching module 32 is configured to determine the external account to be logged into based on an association between the identifier (associated with the internal account) and the external account, and to acquire login information associated with the external account. The association can be represented by a mapping table similar to Tables 1 and 3 as described above with respect to FIG. 1, and can be stored at apparatus 300. The acquired information enables automatic login of the external account and can include, for example, login name and password. In some embodiments, external account searching module 32 is configured to implement at least part of step S105 of FIG. 1.

In some embodiments, external account logon module 33 is configured to enable the external account to be automatically logged in with the account information acquired by external account searching module 32. External account logon module 33 can then allow access to the resources provided by apparatus 300. In some embodiments, external account logon module 33 is configured to implement at least part of step S106 of FIG. 1.

In some embodiments, apparatus 300 further includes a plurality of authentication modules configured to authenticate apparatus 300 with the other server (e.g., apparatus 200 of FIG. 2) from which internal account information receiving module 31 is to receive the internal account information. In some embodiments, as shown in FIG. 3, the authentication modules include a token receiving module 34, a token signing module 35, and a signature transmission module 36. In some embodiments, the aforementioned authentication modules are configured to implement at least part of the authentication process described with respect to method 100 of FIG. 1.

In some embodiments, token receiving module 34 is configured to receive a token from the other server (e.g., apparatus 200 of FIG. 2) for authentication before internal account information receiving module 31 receives the external account information. After receiving the token, token signing module 35 can sign the token. As described before, a pair of corresponding public key and private key can be used for the authentication and verification processes. For example, token signing module 35 can store a private key that is associated with apparatus 300 and is inaccessible by other unauthorized servers and devices, and token signing module 35 can use that private key to sign the token. Signature transmission module 36 can then transmit the signature back to authenticate apparatus 300 to the other server from which the token is received.

In some embodiments, apparatus 300 also includes an external account creation module 37 configured to create an external account. The external account can be created when, for example, external account searching module 32 fails to locate an external account that is associated with the received internal account information. In some embodiments, apparatus 300 also includes a binding module 38 configured to associate the external account created by external account creation module 37 with the received internal account information by, for example, updating Tables 1 and 3 as described above with respect to FIG. 1. After the external account is created, external account logon module 33 can then allow the account to be automatically logged in to provide access to the resources of apparatus 300.

Figure 4:
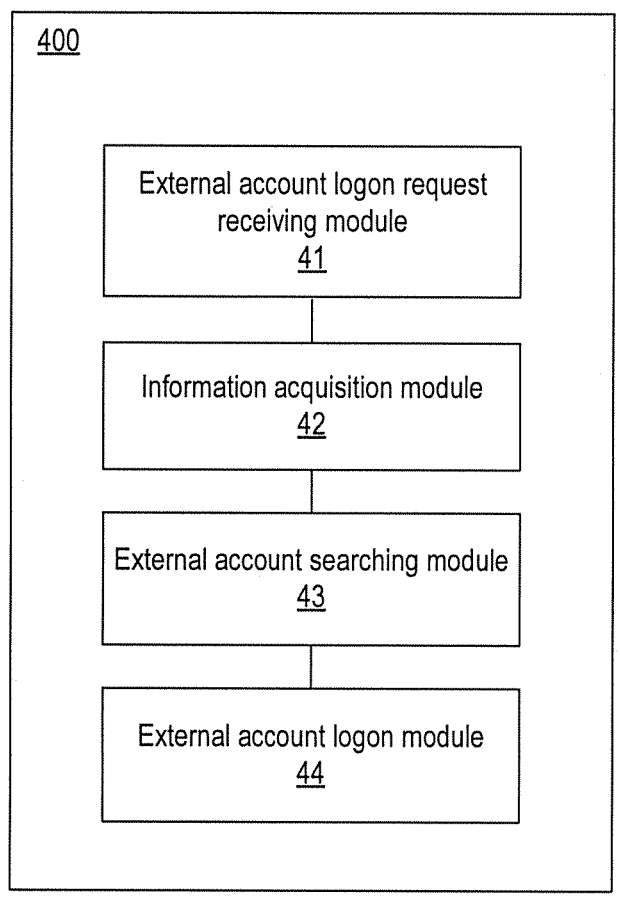
FIG. 4 is a block diagram illustrating an exemplary apparatus for facilitating the login of an account, consistent with embodiments of the present disclosure.

FIG. 4 is a block diagram illustrating of an exemplary apparatus 300 for facilitating the login of an account, consistent with embodiments of the present disclosure. As shown in FIG. 4, apparatus 400 includes an external account logon request receiving module 41, an information acquisition module 42, an external account searching module 43, and an external account logon module 44. In some embodiments, apparatus 400 is configured to be the first server (e.g., an internal server) that implements at least some of the steps of method 100 of FIG. 1, where the first server is associated with a first account (e.g., an internal account) and a second server (e.g., an external server) is associated with a second account (e.g., an external account), that the internal server receives a request for logging into the external account, and that the association between the internal account and the external account (e.g., Tables 1 and 3) is stored in the first server (e.g., at apparatus 400).

In some embodiments, external account logon request receiving module 41 is configured to receive, from a terminal device, a request to log into the external account. In some embodiments, external module login request module 41 can receive the request from a built-in browser of an app installed on the terminal device, after the apps to logs into the internal account associated with apparatus 400. The external account can provide access to the resources of the external server, while the internal account can provide access to the resources of apparatus 400. In some embodiments, external account logon request receiving module 41 is configured to implement at least part of step S101 of method 100.

In some embodiments, information acquisition module 42 is configured to acquire, from the request, a first identifier associated with the internal account, and a second identifier associated with the second server. The second identifier can be, for example, an Internet Protocol (IP) address of the external server, or a domain name that corresponds to the IP address. In some embodiments, information acquisition module 42 is configured to implement at least part of step S102 of method 100.

In some embodiments, external account searching module 43 is configured to determine the external account to be logged into based on an association between the first identifier (associated with the internal account) and the external account, and to acquire login information about the external account. The association can be represented by a mapping table similar to Tables 1 and 3, as described above with respect to FIG. 1, and is stored at apparatus 400.

In some embodiments, external account logon module 44 is configured to transmit the external account login information to the external server. The external server (e.g., the second server) can then use the received information to enable the external account to be automatically logged in (e.g., by performing step S106 of FIG. 1), to provide access to the resources of the external server.

With embodiments of the present disclosure, an external server (e.g., the second server) can acquire login information for an external account (e.g., the first account) based on an association between the external account and an internal account, after receiving an identifier associated with the internal account from an internal server (e.g., the first server). With the acquired login information, the external server can then allow the external account to be automatically logged in. Since the external account information (e.g., the account identifier) is not stored in the cookie data at the terminal device, the security risk posed by unsecure cookie data can be avoided. Also, since the external account number is not entered via a login page, but instead is securely stored at the external server, the user cannot be cheated into providing complete account login information (i.e., including account number and login credentials), and the security risk posed by fake login pages can be avoided as well. Therefore, the security of the external account can be better protected. Moreover, according to embodiments of the present disclosure, since the external account can be automatically logged in, and does not require the user to input the external account login information, account login can be facilitated, and convenience of operation can be improved.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash RAM in a computer-readable medium. The memory is an example of the computer-readable medium.

The computer-readable medium includes non-volatile and volatile media, removable and non-removable media, wherein information storage can be implemented with any method or technology. Information may be modules of computer-readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may used to store information capable of being accessed by a computer device. According to the definition of the context, the computer readable medium does not include transitory media, such as modulated data signals and carrier waves.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by the phrase "comprising a . . . " does not preclude the presence of other same elements in the process, method, commodity or device including said elements under the condition of no more limitations.

As will be understood by those skilled in the art, embodiments of the present invention may be embodied as a method, a system or a computer program product. Accordingly, the present invention may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

One of ordinary skill in the art will understand that the above-described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for facilitating account login, wherein the method is implemented by a first server that is associated with a first account and an app installed on a terminal device, the method comprising:
   receiving, at the first server, a request to log into a second account associated with a second server from the terminal device, wherein the request is generated by a built-in browser of the app when the first account is logged into via the app, wherein the request includes a first identifier associated with the first account and a second identifier associated with the second server;
   generating, at the first server, account information to be transmitted to the second server based on the first identifier; and
   transmitting, from the first server, the account information to the second server based on the second identifier;
   wherein the transmission of the account information enables the second server to determine the second account based on an association between the first account and the second account,
   wherein the transmission of the account information enables the second account to be automatically logged into the second server.

2. The method of claim 1, further comprising authenticating the second server before transmitting the account information to the second server; wherein the authenticating of second server comprises:
   generating a token;
   transmitting the token to the second server;
   receiving a signature associated with the token from the second server; and
   determining the validity of the signature;
   and wherein the second server is authenticated if the signature is determined to be valid.

3. The method of claim 2, wherein transmitting the token to the second server comprises transmitting the token to the app installed on the terminal device, and the app transmitting the token to the second server.

4. The method of claim 2, wherein the second server is associated with a first key; wherein the signature is generated with a second key; and wherein the signature is determined to be valid if the second key matches the first key.

5. The method of claim 1, wherein the account information transmitted to the second server includes the first identifier; wherein the transmission of the first identifier enables the second server to determine the second account based on a first association between the first identifier and the second account.

6. The method of claim 5, wherein the first association is associated with a fourth identifier; wherein the fourth identifier is associated with an app installed on the terminal device.

7. The method of claim 5, wherein the transmission of the first identifier causes the second server to create the second account based on a determination that the first association does not exist when the first identifier is transmitted.

8. The method of claim 1, wherein the account information transmitted to the second server includes a third identifier associated with the second account; wherein the account information is generated based on an association between the first identifier and the third identifier.

9. A server for facilitating account login, wherein the server is associated with a first account and an app installed on a terminal device, the server comprising:
   a memory device that stores a set of instructions; and
   at least one processor capable of executing the set of instructions to cause the server to perform:
   receive, from the terminal device, a request to log into a second account associated with a second server, wherein the request is generated by a built-in browser of the app when the first account is logged into via the app, wherein the request includes a first identifier associated with the first account and a second identifier associated with the second server;
   generate account information to be transmitted to the second server based on the first identifier; and
   transmit the account information to the second server based on the second identifier;
   wherein the transmission of the account information enables the second server to determine the second account based on an association between the first account and the second account, wherein the transmission of the account information enables the second account to be automatically logged into the second server.

10. The server of claim 9, wherein the at least one processor capable of executing the set of instructions to cause the server to authenticate the second server before transmitting the account information to the second server; wherein the at least one processor capable of executing the set of instructions to authenticate the second server comprises the at least one processor capable of executing the set of instructions to cause the server to:
generate a token;
transmit the token to the second server;
receive a signature associated with the token from the second server; and
determine the validity of the signature;
and wherein the second server is authenticated if the signature is determined to be valid.

11. The server of claim 10, wherein the at least one processor capable of executing the set of instructions to cause the server to transmit the token to the second server comprises the at least one processor capable of executing the set of instructions to cause the server to transmit the token to the app installed on the terminal device, and the app transmit the token to the second server.

12. The server of claim 10, wherein the second server is associated with a first key; wherein the signature is generated with a second key; and wherein the signature is determined to be valid if the second key matches the first key.

13. The server of claim 9, wherein the account information transmitted to the second server includes the first identifier; and wherein the transmission of the first identifier enables the second server to determine the second account based on a first association between the first identifier and the second account.

14. The server of claim 13, wherein the first association is associated with a fourth identifier; and wherein the fourth identifier is associated with an app installed on the terminal device.

15. The server of claim 13, wherein the transmission of the first identifier causes the second server to create the second account based on a determination that the first association does not exist when the first identifier is transmitted.

16. The server of claim 9, wherein the account information transmitted to the second server includes a third identifier associated with the second account; wherein the account information is generated based on an association between the first identifier and the third identifier.

* * * * *

UNITED STATES PATENT AND TRADEMARK OFFICE
CERTIFICATE OF CORRECTION

| | |
|---|---|
| PATENT NO. | : 11,281,762 B2 |
| APPLICATION NO. | : 16/289477 |
| DATED | : March 22, 2022 |
| INVENTOR(S) | : Jie Hua |

It is certified that error appears in the above-identified patent and that said Letters Patent is hereby corrected as shown below:

In the Claims

Claim 11, Column 15, Line 23, "app transmit" should read as --app to transmit--.

Signed and Sealed this
Eighth Day of July, 2025

Coke Morgan Stewart
*Acting Director of the United States Patent and Trademark Office*